United States Patent Office 2,831,842
Patented Apr. 22, 1958

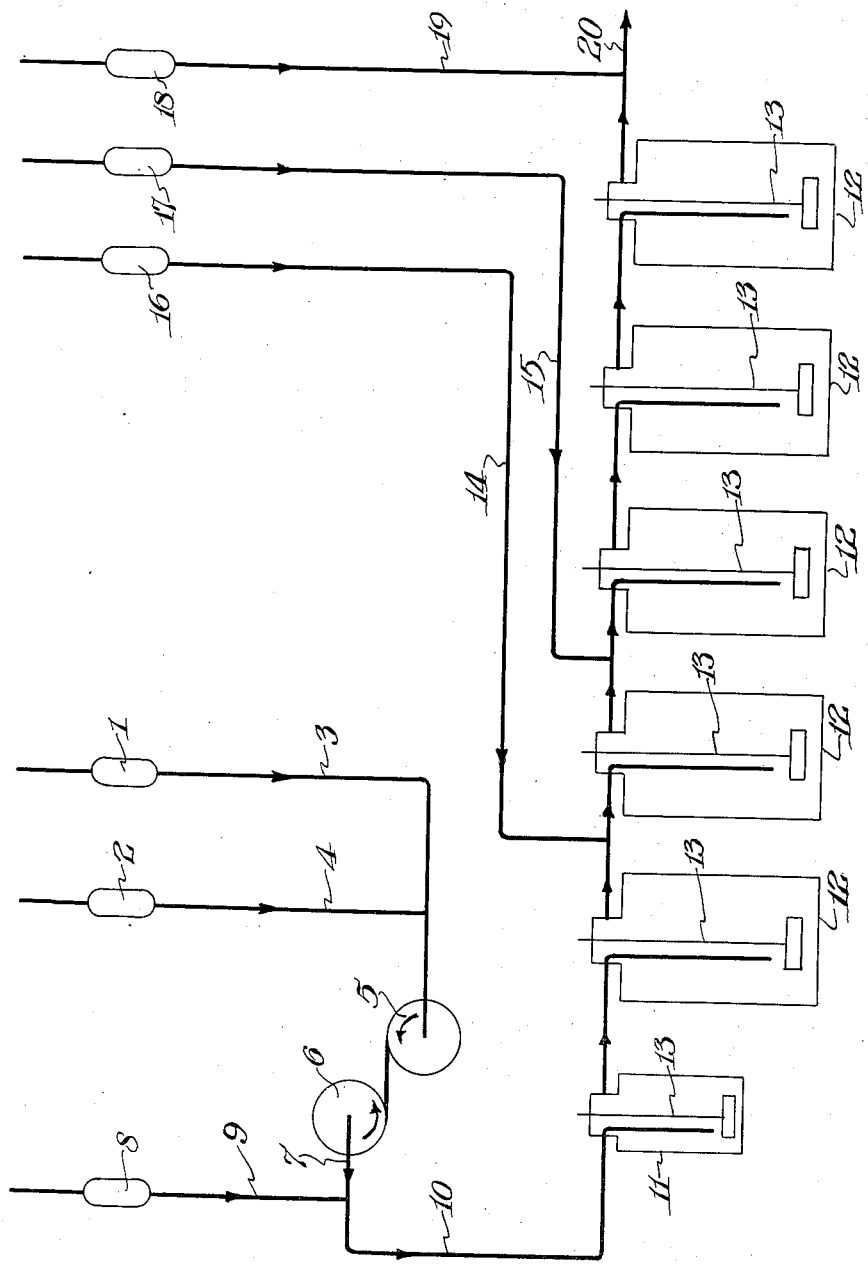

2,831,842

EMULSION POLYMERIZATION PROCESS

Charles E. Aho, Louisville, Ky., assignor to E. I. du Pont de Nemours and Company, Wilmington, Del., a corporation of Delaware Application September 23, 1953, Serial No. 381,929

3 Claims. (Cl. 260—92.3)

This invention relates to an improved emulsion polymerization process, and more particularly to a continuous process for the polymerization of chloroprene.

The polymerization of chloroprene to plastic and elastic rubber-like polymers must be carefully controlled in order to obtain a uniform product, which must conform to a number of quantitative specifications in order to be acceptable by manufacturers of rubber goods. Consequently, even though polymers of chloroprene have been made on a large scale for a number of years, the polymerization is preferably carried out as a batch operation under very carefully controlled conditions. Various methods for the continuous polymerization of chloroprene in emulsion have been described in U. S. Patents 2,384,277 and 2,394,291, in which the patentees have sought to remove some of the difficulties involved in converting the batch process to a continuous one, such as excessive coagulation of the walls of the reaction vessels, by avoiding any turbulence in the dispersion, which, however, makes control of temperature extremely difficult.

It has been found that under certain conditions it is possible to carry out a continuous polymerization similar to that described in U. S. Patent 2,394,291, in which agitation is employed in each vessel, but in such a process the rate of polymerization is slow, and in order to reach the same conversion of chloroprene to polymer in the same time as when the process is carried out by a batch operation, approximately twice the amount of catalyst is required. This adds to the cost of the resulting product, and, when the catalyst is an electrolyte such as potassium persulfate or when it generates an electrolyte, the final latices tend to be less stable.

It is therefore an object of the present invention to provide a continuous process for polymerizing chloroprene without the use of excessive amounts of catalyst, in which substantially the same yields and purity of the resulting polymer are obtained as when polymerization is carried out in a batch process.

I have found that in a continuous process for the polymerization of chloroprene, a satisfactory conversion to a product of good quality can be obtained where the initial polymerization is carried out in a relatively high soap micelle concentration (i. e., soap or other dispersion agent) while keeping the polymer concentration in this solution relatively low. This apparently results in the initiation of polymerization at appreciably more loci than is where the polymerization is initiated in a solution which is lower in soap concentration and higher in the amount of polymer formed; that is, this results in appreciably more polymer particles and therefore an increased surface of the polychloroprene in any given volume of emulsion. This high concentration of soap micelles exists only in the initial stage of the emulsion polymerization, and the polymerization in this stage should be kept between 1% and 10% conversion, and preferably between 2% to 5%. Upon completion of the initial stage, the emulsion continuously passes through reactors of larger volume, preferably in from 3 to 6 stages, and additional catalyst is added to the solution as polymerization proceeds. Generally about one-half of the catalyst employed is added to the emulsion in the initial stage.

As a theoretical explanation of the invention, it appears that as the chloroprene monomer is emulsified with the soap (or soap substitute) solution in the presence of the polymerization catalyst, the polymerization first starts on the soap micelles. (See article by W. D. Harkins, Journal American Chemical Society, vol. 69, page 1443.) In the original soap concentration there is a maximum number of loci at which polymerization can start. As polymerization proceeds, it apparently proceeds faster on the already formed polymer nuclei than in starting new nuclei on the now lesser number of micelles. Where the polymerization in the original concentration of soap is kept below 10% in the first stage, the number of polymer nuclei is much increased over the number formed after a substantial amount of the soap is taken up as films on the larger polymer particles being formed. Since the catalyst and plasticizer enter the neoprene particles by transfer from the aqueous phase, the resultant increased surface obtained by increasing the number of polymer nuclei results in increased catalyst efficiency and plasticization rate.

In the attached drawing, which forms a part of this application, a diagrammatic representation of a system in which the polymerization may be carried out according to this invention is disclosed, it being understood that various modifications and alterations in the type of equipment employed may be made without departing from the spirit of the invention, since the present invention resides primarily in a process for carrying out the continuous process and not in any specific apparatus that may be used for that purpose.

In carrying out the invention in apparatus such as illustrated in the drawings, chloroprene and the emulsifying solution are fed through proportioning pumps 1 and 2 and lines 3 and 4, respectively, into an emulsifier or homogenizer which in the form shown in the accompanying drawing consists of two centrifugal pumps 5 and 6. The outlet of pump 5 exhausts into what is normally the exhaust of pump 6 so that the liquid exhausts from pump 6 at 7 which would normally be the inlet of that pump. Pump 6 may be identical to pump 5 but is operated at a lower speed than pump 5. The centrifugal action of pump 5 effects a partial emulsification of the liquid as it operates against the back pressure of pump 6, in the normal manner it would operate when working against a substantial back pressure. The liquid driven from pump 5 through pump 6 circulating against the action of the impeller in the pump 6, is further emulsified. The catalyst solution for the polymerization is introduced through a proportioning pump 8 and line 9 into line 10, and passes with the emulsion into the polymerizing vessels. The polymerizing vessels consist of a smaller vessel 11 approximately one-fifth the volume of each of the remaining vessels 12. Each of the vessels is equipped with an agitator 13 and with a jacket or other means for heating and cooling the contents of the vessels (not shown). The inlet of each vessel is near the bottom, while the outlet is at the top. The vessels are connected in series so that the outlet from each vessel discharges into a line leading to the inlet of the next vessel. Additional catalyst may be introduced into the emulsion stream through lines 14 and 15 which are equipped with proportioning pumps 16 and 17, respectively, so that the rate of addition may be carefully controlled. When desired, a suitable plasticizing or short-stopping agent may be added to the emulsion through proportioning pump 18 and line 19 as the polymer emulsion is lead off through line 20 from the last polymerizing vessel.

The following examples are given to illustrate the invention, and are carried out in the system described above. The parts used are by weight.

*Example 1*

Chloroprene containing approximately 4% of wood rosin and 0.5% of sulfur is fed into the emulsifying solution containing approximately 0.6% of sodium hydroxide and 0.3% of the sodium salt of formaldehyde-naphthalene sulfonic acid condensation product, and emulsified through pumps 5 and 6 as illustrated in the accompanying drawing. An aqueous catalyst solution containing 5% of potassium persulfate and 0.25% of anthraquinone beta sodium sulfonate is then added to the chloroprene emulsion. The chloroprene is fed at the rate of 53 parts per minute, the emulsifying solution at the rate of 77 parts per minute and the catalyst solution at the rate of 1.6 parts per minute. This solution is then passed into a first polymerization vessel 11, the size of the vessel being such, as compared to the feed rates, that the hold-up time in that vessel is approximately 5 minutes, while the size of each of the remaining vessels in the system is such that the hold-up time in each is approximately 25 minutes. Approximately 2% of the polymerization takes place in the preliminary reaction vessel 11, while the remainder takes place in the five larger reaction vessels for a total of approximately 90% conversion of the monomer to polymer. During the passage of the polymer emulsion from one reaction vessel to the other, an additional 1.6 parts of catalyst is added in the emulsion stream at one or more places, as illustrated in the drawing at 14 and 15.

As the polymer emulsion exhausts from the last polymerization vessel, a plasticizing agent such as tetraethyl thiuram disulfide is added through the proportioning pump 18 and line 19. When 2.8 parts per minute of a 28% aqueous dispersion of tetraethyl thiuram disulfide is added to the polymer emulsion and the resulting polymer, without isolation, is aged under agitation for 8 hours, it gives, on isolation, a Williams plasticity number of 120.

When the polymerization as above described was carried out in the same apparatus except that the preliminary polymerization vessel 11 was omitted and the chloroprene and catalyst solution was introduced directly into the larger polymerization vessels, approximately twice as much catalyst was required to give the same polymerization rate and 16 hours' aging of the emulsion polymer were required to produce a product of the same plasticity number as was obtained in 8 hours, of aging using the preliminary polymerization as described in the above example.

*Example 2*

Using the apparatus of Example 1, chloroprene solution containing 3% of a disproportionated rosin and 0.3% of dodecyl mercaptan introduced at the rate of 81 parts per minute is emulsified in a water solution containing 0.46% of sodium hydroxide, 0.33% of the sodium salt of a condensed naphthalene sulfonic acid, and 0.25% of sodium sulfite, introduced at a rate of 94 parts per minute. A catalyst solution containing 0.3% of potassium persulfate and 0.015% of anthraquinone beta sulfonic acid is mixed with this emulsion at the rate of 1.05 parts per minute and introduced into the small polymerization vessel and thence to the series of polymerization vessels. Additional amounts of catalyst solution, totaling 1.95 parts per minute, are introduced into the emulsion streams between the first and the last polymerization vessels. Because of the greater rates of feed in comparison with Example 1, the hold-up time in the first vessel is 3.5 minutes and about 17 minutes in each of the five large vessels. The first 4% of polymer is formed in the small vessel, 14% in each of the first four main vessels and 10% in the last. As the polymer emulsion leaves the last vessel, a shortstopping agent, such as disclosed in U. S. Patent 2,576,009 to Goertz or in U. S. Patent 2,567,117 to Mochel, may be added to stabilize the polymer. The unpolymerized chloroprene may be removed by the process described in U. S. Patent 2,467,769 to Morrow and Parsons, or by any other suitable method. The polymer appears to be in every way identical with that made by batch polymerization. As in Example 1, if the continuous polymerization is carried out without holding the emulsion in the small flask for a short time before subjecting it to the main part of the polymerization, about twice as much catalyst is required to give the same polymerization rate.

The process of the present invention is applicable to the polymerization of chloroprene, which term is used to include mixtures of chloroprene with smaller amounts of copolymerizable materials such as 2,3-dichloro-1,3-butadiene, etc. It may be used to carry out polymerizations in all types of emulsions such as anionic, cationic and non-ionic, in which soap or a soap-like dispersing agent is employed. In the usual anionic systems, soluble salts of monocarboxylic acids containing from 12 to 24 carbon atoms are the preferred dispersing agents. The initial soap (or soap substitute) concentration of the chloroprene emulsion should be between 2% and 10%, based on the weight of the chloroprene to be emulsified.

Any catalyst effective in aqueous emulsion polymerization of chloroprene may be used, any may be either a separately added catalyst or a catalyst arising from the oxidation of the chloroprene. The amount of catalyst used should be substantially the amount normally used in batch polymerization and is generally from 0.01% to 1.0% of the weight of the chloroprene employed. Usually about one-half of the catalyst will be employed in the initial stage of the reaction, the second half being added as the polymerization proceeds, preferably divided between two or more of the subsequent stages.

It is of course understood that the process is applicable to the polymerization of chloroprene using other modifying agents than sulfur, such as mercaptans, iodoform, and other telomers.

The present invention may be used to advantage in connection with any continuous emulsion polymerization procedure in which an emulsion of the material to be polymerized is introduced continuously into a vessel under agitation from which a continuous stream of polymerized material is withdrawn; in other words, in which the feed is mixed with material in a more advanced stage of polymerization. This main part of the polymerization, following the preliminary treatment which forms the essential part of this invention, may be carried out in one or more vessels, preferably 3 to 6. These may be of the same or different size, but obviously their total volume must be large in relation to the volume of the vessel in which the preliminary treatment takes place, in order to satisfy the condition that not more than 10% of the polymerization should take place in the latter.

The temperature may be the same or different in the different vessels and may be maintained by suitable coils, jackets, or other devices for heating and cooling, as required. The temperature of polymerization may be any already used in the art for chloroprene emulsion, and preferably between 30° and 50° C.

The process of the present invention requires no unusual equipment. Jacketed glass-lined kettles such as employed in the usual batch polymerization are suitable, and the same type of agitator may be employed, operated only fast enough to give adequate heat exchange between the walls of the kettle and the polymer emulsion. The proportioning pumps are of conventional types. The flow from one vessel to another may be by gravity or under the force of the feed pumps. Any type of emulsifying equipment may be employed, including a single centrifugal pump through which a stream of the monomer is recirculated with the emulsifying solution until the required degree of emulsification is obtained.

I claim:

1. In a continuous process for the polymerization of chloroprene in an aqueous emulsion and in the presence of a chloroprene polymerization catalyst, in which the polymerization is carried out under agitation in a series of stages through which the emulsion continually passes, the step which comprises carrying out the first stage in an aqueous emulsion containing initially from 2% to 10% of an emulsifying agent, based on the weight of the chloroprene, until not more than 10% of the chloroprene is polymerized, and continuing the polymerization in stages separate from the initial stage until the desired degree of polymerization is obtained.

2. In a continuous process for the polymerization of chloroprene in an aqueous emulsion and in the presence of a chloroprene polymerization catalyst, in which the polymerization is carried out under agitation in a series of stages through which the emulsion continually passes, the step which comprises carrying out the first stage in an aqueous emulsion containing initially from 2% to 10% of an emulsifying agent, based on the weight of the chloroprene, until from 2% to 5% of the chloroprene is polymerized, and continuing the polymerization in stages separate from the initial stage until the desired degree of polymerization is obtained.

3. In a continuous process for the polymerization of chloroprene in an aqueous emulsion and in the presence of a chloroprene polymerization catalyst, in which the polymerization is carried out under agitation in a series of stages through which the emulsion continually passes, the step which comprises carrying out the first step in an aqueous dispersion containing initially from 2% to 10% of an emulsifying agent, based on the weight of the chloroprene, until from 2% to 5% of the chloroprene is polymerized, and continuing the polymerization in five stages separate from the initial stage until the desired degree of polymerization is obtained, about half of the catalyst being added to the emulsion in the initial stage while the remainder is added to the subsequent stages of polymerization.

References Cited in the file of this patent

UNITED STATES PATENTS

| | | |
|---|---|---|
| 2,384,277 | Calcott et al. | Sept. 4, 1945 |
| 2,394,291 | Calcott et al. | Feb. 5, 1946 |
| 2,475,016 | De Nie | July 5, 1949 |